(12) United States Patent
Archer et al.

(10) Patent No.: US 7,890,597 B2
(45) Date of Patent: Feb. 15, 2011

(54) DIRECT MEMORY ACCESS TRANSFER COMPLETION NOTIFICATION

(75) Inventors: Charles J. Archer, Rochester, MN (US); Michael A. Blocksome, Rochester, MN (US); Jeffrey J. Parker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 11/829,317

(22) Filed: Jul. 27, 2007

(65) Prior Publication Data

US 2009/0031325 A1     Jan. 29, 2009

(51) Int. Cl.
*G06F 15/167*     (2006.01)

(52) U.S. Cl. .................. 709/212; 719/319; 719/313; 710/22; 710/23; 710/24; 710/220; 710/44; 370/406

(58) Field of Classification Search ............... 719/313, 719/315; 709/223, 212; 710/22–24, 220, 710/44; 370/406, 235
See application file for complete search history.

(56) References Cited

U.S. PATENT DOCUMENTS

| | | | |
|---|---|---|---|
| 4,933,846 A | 6/1990 | Humphrey et al. |
| 5,136,582 A | 8/1992 | Firoozmand |
| 5,448,698 A | 9/1995 | Wilkes |
| 5,689,509 A | 11/1997 | Gaytan et al. |
| 5,758,075 A | 5/1998 | Graziano et al. |
| 5,796,735 A | 8/1998 | Miller et al. |
| 5,802,366 A | 9/1998 | Row et al. |
| 5,961,659 A | 10/1999 | Benner |
| 6,161,198 A | 12/2000 | Hill et al. |
| 6,356,951 B1 | 3/2002 | Gentry, Jr. |
| 6,711,632 B1 * | 3/2004 | Chow et al. ............ 710/29 |
| 6,735,662 B1 | 5/2004 | Connor |
| 6,744,765 B1 | 6/2004 | Dearth et al. |
| 6,754,732 B1 | 6/2004 | Dixon et al. |
| 6,857,030 B2 | 2/2005 | Webber |
| 6,977,894 B1 | 12/2005 | Achilles et al. |
| 6,981,074 B2 | 12/2005 | Oner et al. |
| 7,031,305 B1 | 4/2006 | Yu et al. |

(Continued)

OTHER PUBLICATIONS

Office Action Dated Oct. 14, 2008 in U.S. Appl. No. 11/754,719.

(Continued)

*Primary Examiner*—Nathan Flynn
*Assistant Examiner*—Mohammad A Siddiqi
(74) *Attorney, Agent, or Firm*—Biggers & Ohanian, LLP

(57) ABSTRACT

Methods, systems, and products are disclosed for DMA transfer completion notification that include: inserting, by an origin DMA on an origin node in an origin injection FIFO, a data descriptor for an application message; inserting, by the origin DMA, a reflection descriptor in the origin injection FIFO, the reflection descriptor specifying a remote get operation for injecting a completion notification descriptor in a reflection injection FIFO on a reflection node; transferring, by the origin DMA to a target node, the message in dependence upon the data descriptor; in response to completing the message transfer, transferring, by the origin DMA to the reflection node, the completion notification descriptor in dependence upon the reflection descriptor; receiving, by the origin DMA from the reflection node, a completion packet; and notifying, by the origin DMA in response to receiving the completion packet, the origin node's processing core that the message transfer is complete.

18 Claims, 8 Drawing Sheets

U.S. PATENT DOCUMENTS

| | | |
|---|---|---|
| 7,111,092 B1 | 9/2006 | Mitten et al. |
| 2004/0057380 A1 | 3/2004 | Biran et al. |
| 2004/0078405 A1 | 4/2004 | Bhanot et al. |
| 2004/0218631 A1 | 11/2004 | Ganfield |
| 2006/0230119 A1* | 10/2006 | Hausauer et al. ............ 709/216 |
| 2007/0165672 A1* | 7/2007 | Keels et al. ................. 370/474 |
| 2008/0273543 A1 | 11/2008 | Blocksome et al. |

OTHER PUBLICATIONS

Office Action Dated Mar. 4, 2009 in U.S. Appl. No. 11/754,719.
Office Action Dated Nov. 21, 2008 in U.S. Appl. No. 11/758,167.
Office Action Dated Aug. 20, 2009 in U.S. Appl. No. 11/744,296.
Office Action Dated Sep. 2, 2009 in U.S. Appl. No. 11/746,348.
Final Office Action Dated Apr. 24, 2009 in U.S. Appl. No. 11/758,167.
Final Office Action Dated Aug. 5, 2009 in U.S. Appl. No. 11/754,719.
Notice of Allowance Dated Apr. 6, 2010 in U.S. Appl. No. 11/754,719.
Final Office Action Dated Feb. 23, 2010 in U.S. Appl. No. 11/746,348.
Final Office Action Dated Feb. 24, 2010 in U.S. Appl. No. 11/744,296.
Notice of Allowance Dated Mar. 12, 2010 in U.S. Appl. No. 11/758,167.
Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.
Notice of Allowance, U.S. Appl. No. 11/754,719, mail date Apr. 6, 2010.
Office Action, U.S. Appl. No. 11/744,319, mail date May 12, 2010.
Office Action, U.S. Appl. No. 11/829,317, mail date May 26, 2010.

* cited by examiner

US 7,890,597 B2

DIRECT MEMORY ACCESS TRANSFER COMPLETION NOTIFICATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for direct memory access ('DMA') transfer completion notification.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

When a parallel application running on a compute node transmits a message to another compute node connected to the data communications network, the application typically provides messaging software with a pointer to an application buffer storing the message. The messaging software describes the message in the application buffer to a direct memory access ('DMA') engine, which in turn, sends the message through the network using a DMA transfer operation. When notified by the DMA engine that the transfer is complete, the application frees up the application buffer for use with another operation and continues with its flow of execution. The drawback to current methods used by the DMA engine to notify the application that the transfer is complete is that the DMA engine must typically wait for an acknowledgement message from the compute node receiving the transfer before notifying the application that the transfer is complete. Waiting for an acknowledgement message from the compute node that received the transfer often introduces additional latency penalties when processing the application. As such, readers will appreciate that room for improvement exists in DMA transfer completion notification.

SUMMARY OF THE INVENTION

Methods, systems, and products are disclosed for direct memory access ('DMA') transfer completion notification that include: inserting, by an origin DMA engine on an origin compute node in an origin injection first-in-first-out ('FIFO')

buffer, a data descriptor for an application message to be transferred to a target compute node on behalf of an application on the origin compute node; inserting, by the origin DMA engine, a reflection descriptor in the origin injection FIFO buffer after the data descriptor for the application message, the reflection descriptor specifying a remote get operation for injecting a completion notification descriptor in a reflection injection FIFO buffer on a reflection compute node, the completion notification descriptor specifying a data transfer operation between the reflection compute node and the origin compute node and specifying a completion packet header for use in the data transfer operation; transferring, by the origin DMA engine to the target compute node, the application message in dependence upon the data descriptor; in response to completing the transfer of the application message, transferring, by the origin DMA engine to the reflection compute node for injection in the reflection injection FIFO buffer on the reflection compute node, the completion notification descriptor in dependence upon the reflection descriptor; receiving, by the origin DMA engine from the reflection compute node, a completion packet having the completion packet header specified in the completion notification descriptor; and notifying, by the origin DMA engine in response to receiving the completion packet, a processing core on the origin compute node that the transfer of the application message is complete.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
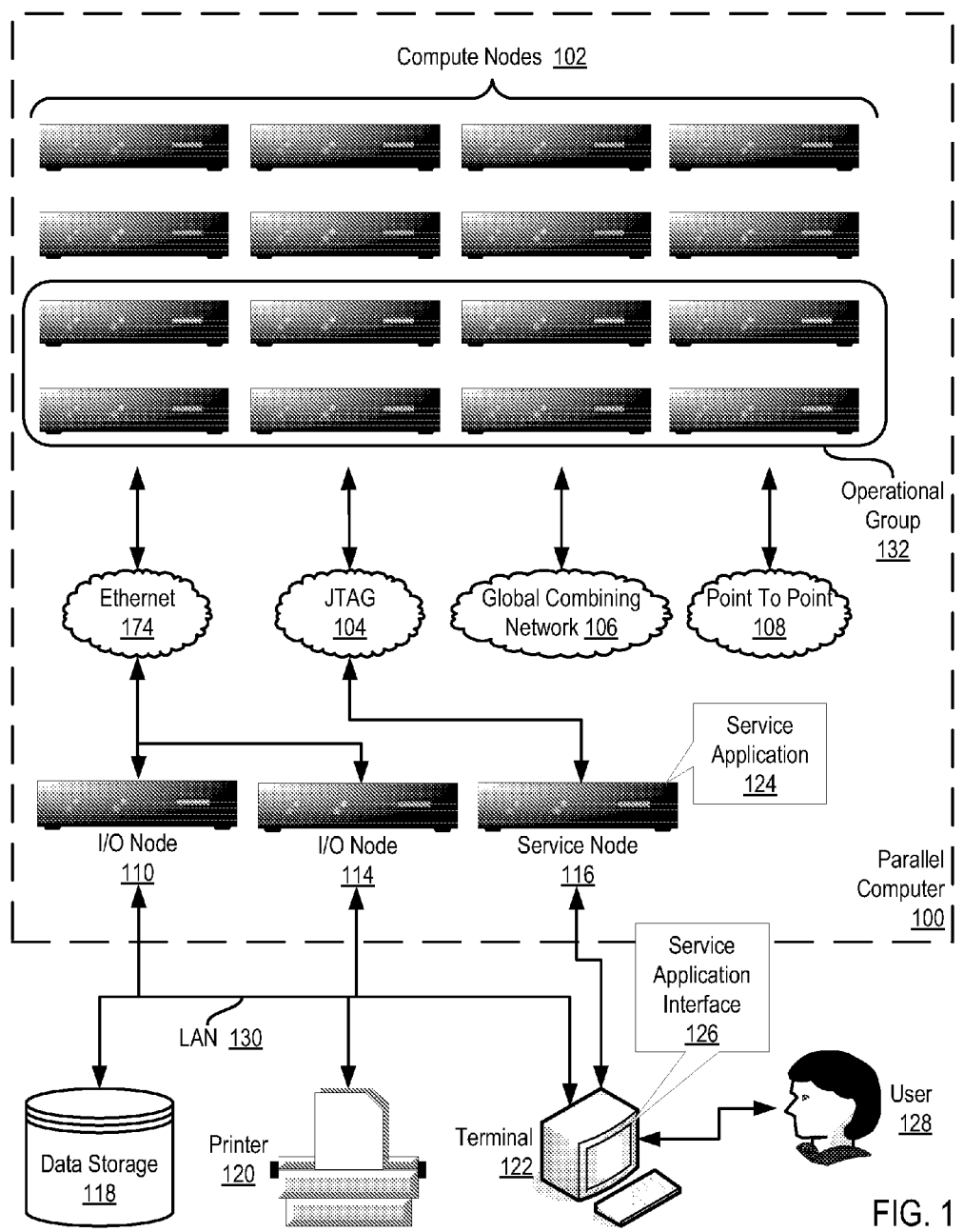
FIG. 1 illustrates an exemplary system for DMA transfer completion notification according to embodiments of the present invention.

Exemplary methods, systems, and computer program products for direct memory access ('DMA') transfer completion notification according to embodiments of the present invention are described with reference to the accompanying drawings, beginning with FIG. 1. FIG. 1 illustrates an exemplary system for DMA transfer completion notification according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for DMA transfer completion notification according to embodiments of the present invention. The system of FIG. 1 operates generally for DMA transfer completion notification according to embodiments of the present invention as follows: an origin DMA engine on an origin compute node inserts a data descriptor in an origin injection first-in-first-out ('FIFO') buffer for the origin DMA engine. The data descriptor describes an application message to be transferred to a target compute node on behalf of an application on the origin compute node. The origin DMA engine also inserts a reflection descriptor in the origin injection FIFO buffer after the data descriptor for the application message. The reflection descriptor specifies a remote get operation for injecting a completion notification descriptor in a reflection injection FIFO buffer on a reflection compute node. The completion notification descriptor specifies a data transfer operation between the reflection compute node and the origin compute node and specifies a completion packet header for use in the data transfer operation. In dependence upon the data descriptor, the origin DMA engine transfers the application message to the target compute node. In response to completing the transfer of the application message, the origin DMA engine transfers the completion notification descriptor, in dependence upon the reflection descriptor, to the reflection compute node for injection in the reflection injection FIFO buffer on the reflection compute node. The origin DMA engine receives a completion packet from the reflection compute node. The completion packet has the completion packet header specified in the completion notification descriptor. In response to receiving the completion packet, the origin DMA engine then notifies a processing core on the origin compute node that the transfer of the application message is complete.

From the perspective of the reflection compute node, the system of FIG. 1 may also operate generally for DMA transfer completion notification according to embodiments of the present invention as follows: a reflection DMA engine on the reflection compute node receives a completion notification descriptor from the origin compute node and injects the completion notification descriptor in the reflection injection FIFO buffer on the reflection compute node. The reflection DMA engine then processes the completion notification descriptor without invoking a processing core on the reflection compute node.

Readers will note that the origin compute node is a compute node attempting to transmit an application message, while the target compute node is a compute node intended as the recipient of the application message. The reflection compute node is a compute node to which a completion notification descriptor is transferred by the origin compute node in response to completing an application message transmission. The reflection compute node is so called because, upon processing the completion notification descriptor provided by the origin compute node, the reflection compute node sends a completion packet back to the origin compute node that is used to notify the origin node's processing core that the application message transmission is complete.

As mentioned above, the origin DMA engine transfers a completion notification descriptor to the reflection compute node based on the reflection descriptor that specifies a remote get operation. A remote get operation is a DMA operation that allows a compute node to retrieve data from another compute node without involving the processor on the compute node providing the data.

The arrangement of nodes, networks, and I/O devices making up the exemplary system illustrated in FIG. 1 are for explanation only, not for limitation of the present invention. Data processing systems capable of DMA transfer completion notification according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of DMA transfer completion notification according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

DMA transfer completion notification according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of DMA transfer completion notification according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
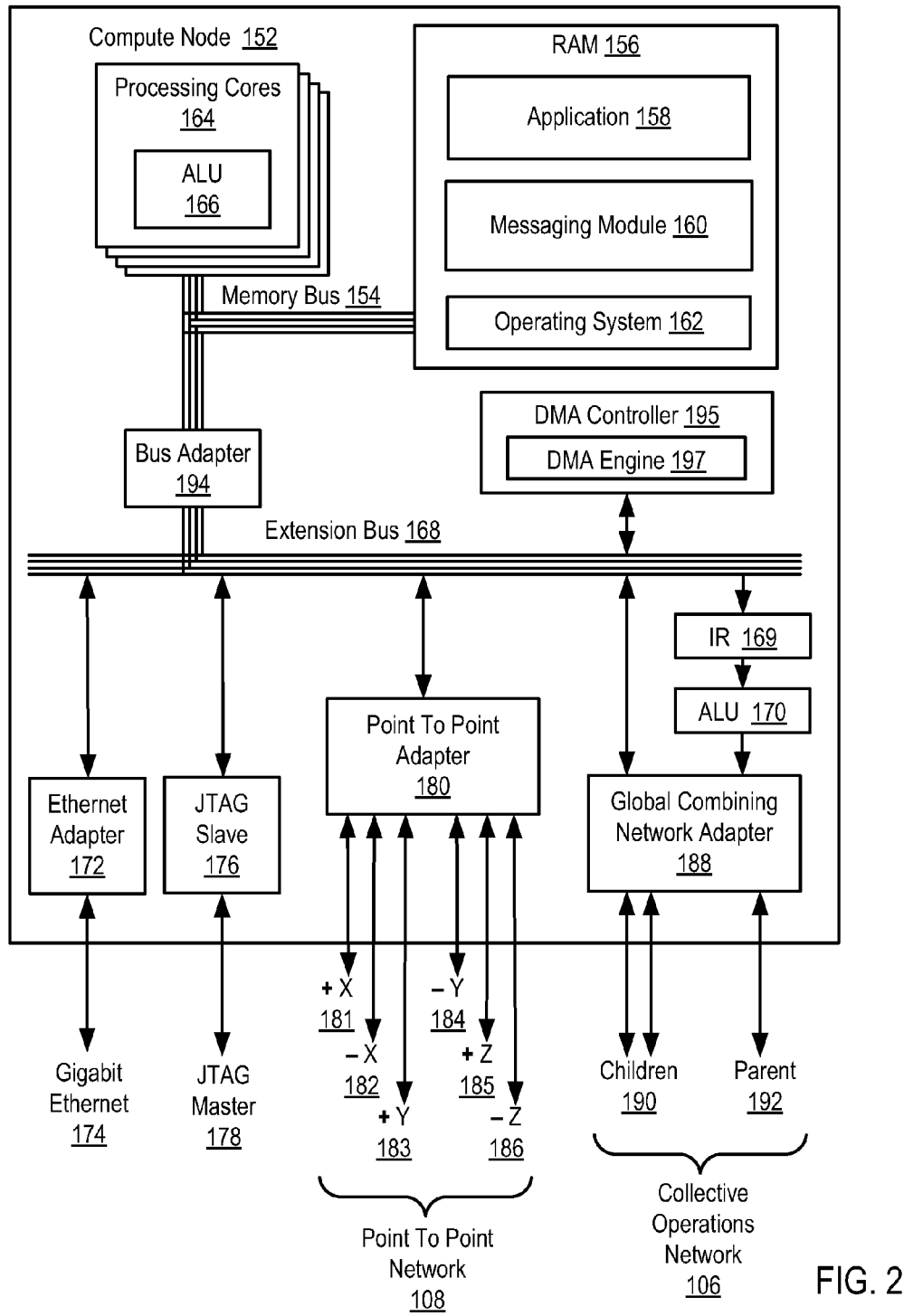
FIG. 2 sets forth a block diagram of an exemplary compute node useful in a parallel computer capable of DMA transfer completion notification according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for DMA transfer completion notification according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in DMA transfer completion notification according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) is typically stored in computer memory included in the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The DMA engine (197) of FIG. 2 is improved for DMA transfer completion notification according to embodiments of the present invention. The DMA engine (197) of FIG. 2 operates generally for DMA transfer completion notification according to embodiments of the present invention by: inserting, in an origin injection FIFO buffer, a data descriptor for an application message to be transferred to a target compute node on behalf of the application (158); inserting a reflection descriptor in the origin injection FIFO buffer after the data descriptor for the application message, the reflection descriptor specifying a remote get operation for injecting a completion notification descriptor in a reflection injection FIFO buffer on a reflection compute node, the completion notification descriptor specifying a data transfer operation between the reflection compute node and the origin compute node and specifying a completion packet header for use in the data transfer operation; transferring the application message to the target compute node in dependence upon the data descriptor; in response to completing the transfer of the application message, transferring, to the reflection compute node for injection in the reflection injection FIFO buffer on the reflection compute node, the completion notification descriptor in dependence upon the reflection descriptor; receiving, from the reflection compute node, a completion packet having the completion packet header specified in the completion notification descriptor; and notifying, in response to receiving the completion packet, a processing core (164) on the origin compute node (152) that the transfer of the application message is complete.

Figure 3A:
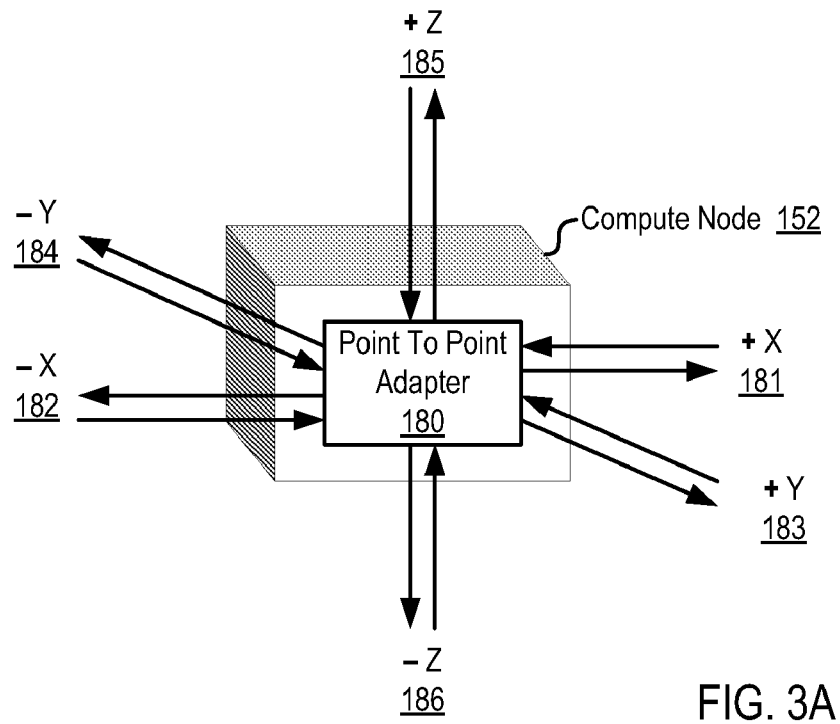
FIG. 3A illustrates an exemplary Point To Point Adapter useful in systems capable of DMA transfer completion notification according to embodiments of the present invention.

For further explanation, FIG. 3A illustrates an exemplary Point To Point Adapter (180) useful in systems capable of DMA transfer completion notification according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
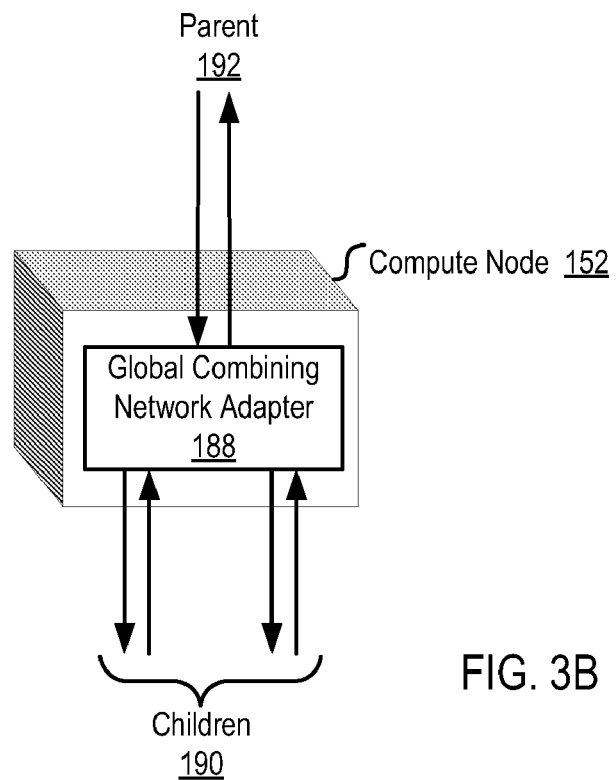
FIG. 3B illustrates an exemplary Global Combining Network Adapter useful in systems capable of DMA transfer completion notification according to embodiments of the present invention.

For further explanation, FIG. 3B illustrates an exemplary Global Combining Network Adapter (188) useful in systems capable of DMA transfer completion notification according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
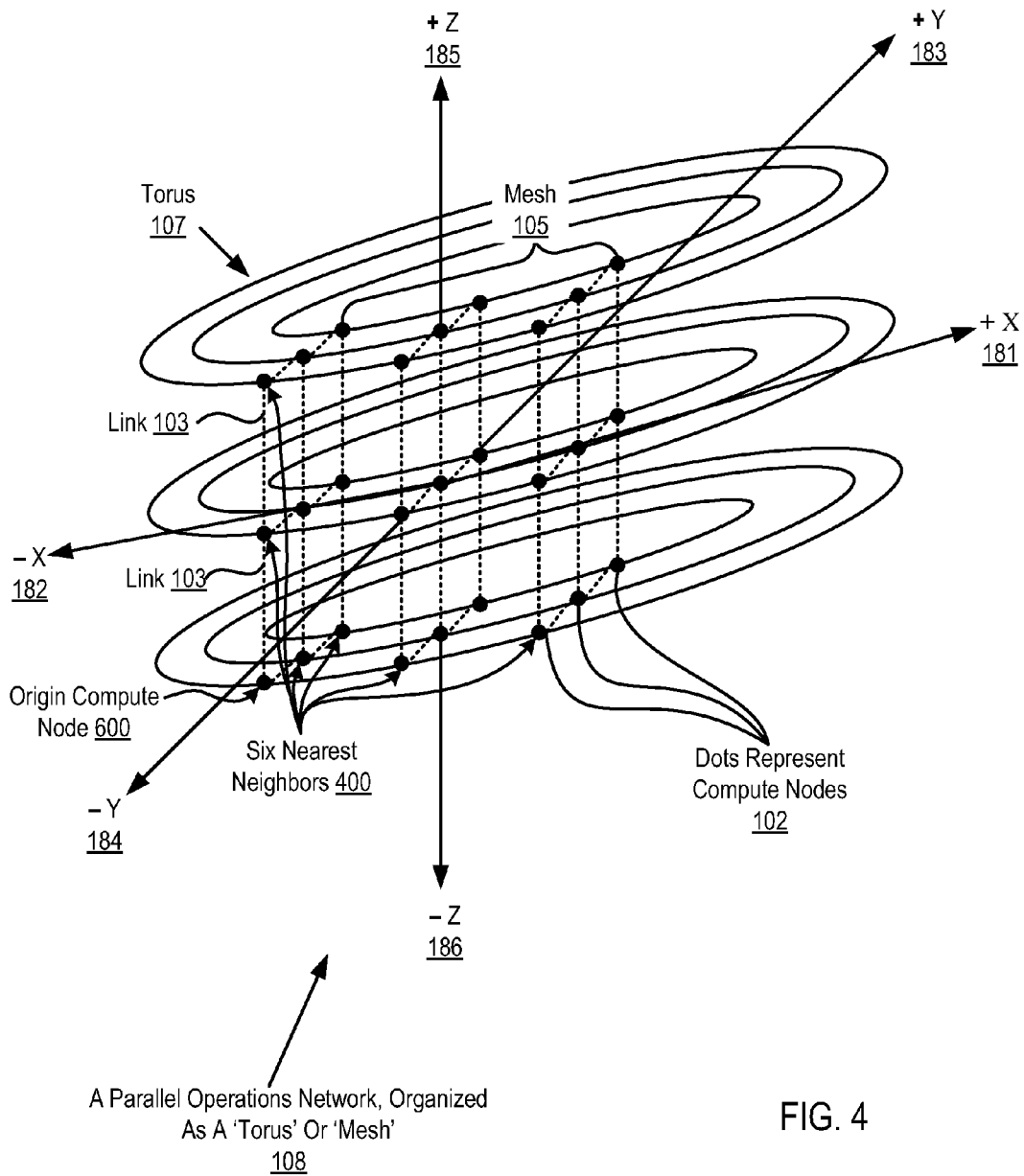
FIG. 4 sets forth a line drawing illustrating an exemplary data communications network optimized for point to point operations useful in systems capable of DMA transfer completion notification in accordance with embodiments of the present invention.

For further explanation, FIG. 4 sets forth a line drawing illustrating an exemplary data communications network (108) optimized for point to point operations useful in systems capable of DMA transfer completion notification in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in DMA transfer completion notification in accordance with embodiments of the present invention may contain only a few compute nodes or may contain thousands of compute nodes.

In systems capable of DMA transfer completion notification in accordance with embodiments of the present invention, a reflection compute node used to process a completion notification descriptor is often implemented as a nearest neighbor of the origin compute node (600). The nearest neighbors of a particular compute node are those compute nodes physically connected to the particular compute node in the data communication network topology. That is, no intervening compute nodes exist in the physical connection between a particular compute node and each of its nearest neighbors. The example of FIG. 4 illustrates the six nearest neighbors (400) to the origin compute node (600) in the torus network (107). Each of the six nearest neighbors is physically connected to the origin compute node (600) in the torus network (107).

Figure 5:
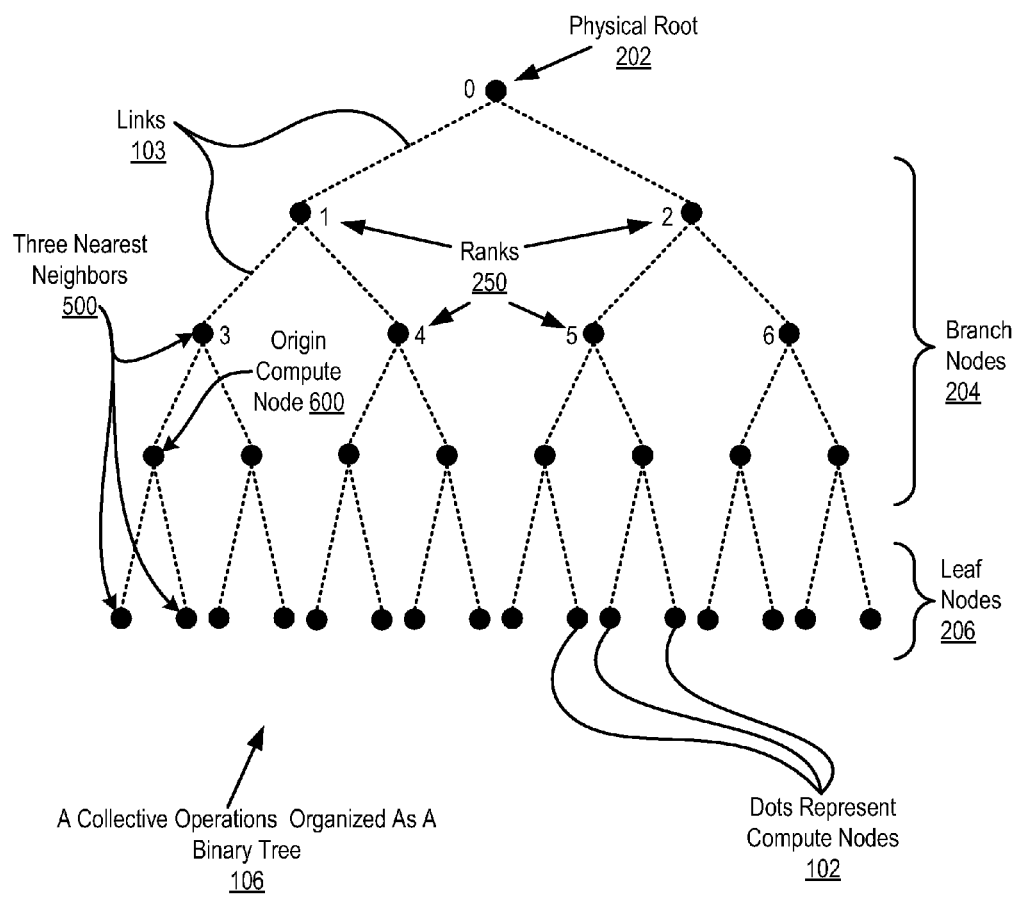
FIG. 5 sets forth a line drawing illustrating an exemplary data communications network optimized for collective operations useful in systems capable of DMA transfer completion notification in accordance with embodiments of the present invention.

For further explanation, FIG. 5 sets forth a line drawing illustrating an exemplary data communications network (106) optimized for collective operations useful in systems capable of DMA transfer completion notification in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for DMA transfer completion notification accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In systems capable of DMA transfer completion notification in accordance with embodiments of the present invention, a reflection compute node used to process a completion notification descriptor is often implemented as a nearest neighbor of the origin compute node (600). The nearest neighbors of a particular compute node are those compute nodes physically connected to the particular compute node in the data communication network topology. That is, no intervening compute nodes exist in the physical connection between a particular compute node and each of its nearest neighbors. The example of FIG. 5 illustrates the three nearest neighbors (500) to the origin compute node (600) in the tree network (106). Each of the three nearest neighbors is physically connected to the origin compute node (600) in the tree network (106).

Figure 6:
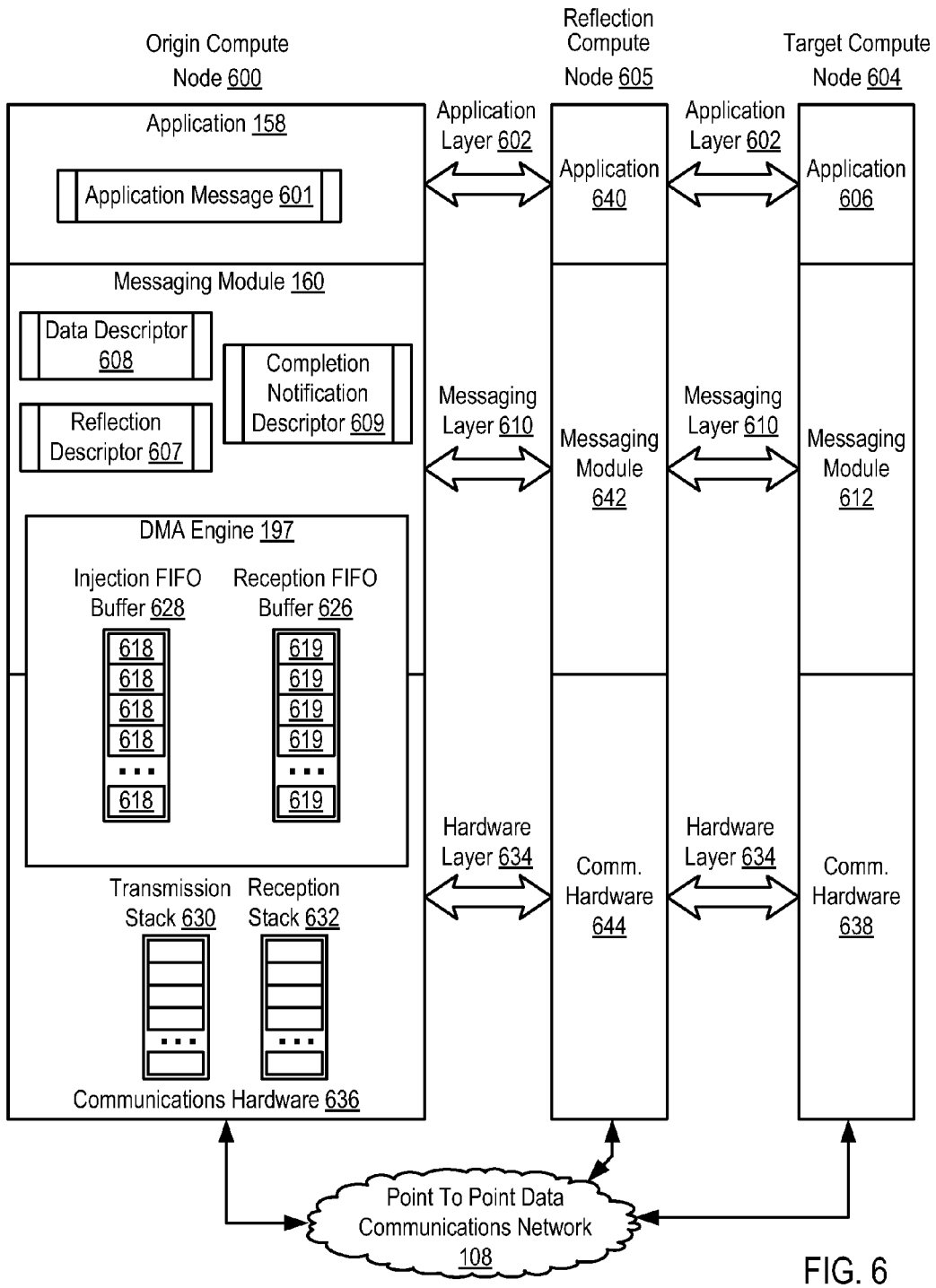
FIG. 6 sets forth a block diagram illustrating an exemplary communications architecture illustrated as a protocol stack useful in DMA transfer completion notification according to embodiments of the present invention.

For further explanation, FIG. 6 sets forth a block diagram illustrating an exemplary communications architecture illustrated as a protocol stack useful in DMA transfer completion notification according to embodiments of the present invention. The exemplary communications architecture of FIG. 6 sets forth three compute nodes, an origin compute node (600), a reflection compute node (605), and a target compute node (604). Only three compute nodes are illustrated in the example of FIG. 6 for ease of explanation and not for limitation. In fact, DMA transfer completion notification according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600), an application (606) installed on the target compute node (604), and an application (640) installed on the reflection compute node (605). In the example of FIG. 6, the application (158) on the origin compute node (600) has an application message (601) for transmission to the application (606) on the target compute node (604). Data communications between applications (158, 606, 640) are effected using messaging modules (160, 612, 642) installed on each of the compute nodes (600, 604, 605). Applications (158, 606, 640) may communicate by invoking function of an application programming interfaces ('API') exposed by the application messaging modules (606, 612. 642). To transmit the message (601) to the application (606), the application (158) of FIG. 6 may invoke a function of an API for messaging module (160) that passes a buffer identifier of an application buffer containing the application message (601) to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158, 606, 640) in the application layer (602). In the example of FIG. 6, the messaging layer (610) is composed of messaging module (160) installed on the origin compute node (600), messaging module (612) installed on the target compute node (604), and messaging module (642) installed on the reflection compute node (605).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600, 604, 605) on the physical network medium. The hardware layer (634) of FIG. 6 is composed of communications hardware (636) of the origin compute node (600), communications hardware (638) of the target compute node (636), communications hardware (644) of the reflection compute node (605), and the data communications network (108) connecting the origin compute node (600), the target compute node (604), and the reflection compute node (605). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in DMA transfer completion notification according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive network packets (619) from other DMA engines on other compute nodes. Although FIG. 6 only illustrates a single injection FIFO buffer (628) and a single reception FIFO buffer (626), readers will note that a DMA engine may have access to any number of injection FIFO buffers and reception FIFO buffers.

In the example of FIG. 6, the DMA engine (197) is improved for DMA transfer completion notification according to embodiments of the present invention. The DMA engine (197) of FIG. 6 operates generally for DMA transfer completion notification according to embodiments of the present invention by: inserting, in an origin injection FIFO buffer (628), a data descriptor (608) for an application message (601) to be transferred to a target compute node (604) on behalf of the application (158); inserting a reflection descriptor (607) in the origin injection FIFO buffer (628) after the data descriptor (608) for the application message (601), the reflection descriptor (607) specifying a remote get operation for injecting a completion notification descriptor (609) in a reflection injection FIFO buffer on a reflection compute node (605), the completion notification descriptor (609) specifying a data transfer operation between the reflection compute node (605) and the origin compute node (600) and specifying a completion packet header for use in the data transfer operation; transferring the application message (601) to the target compute node (604) in dependence upon the data descriptor (608); in response to completing the transfer of the application message (601), transferring, to the reflection compute node (605) for injection in the reflection injection FIFO buffer on the reflection compute node (605), the completion notification descriptor (609) in dependence upon the reflection descriptor (607); receiving, from the reflection compute node (605), a completion packet having the completion packet header specified in the completion notification descriptor (609); and notifying, in response to receiving the completion packet, a processing core on the origin compute node (600) that the transfer of the application message (601) is complete.

The messaging module (160) of FIG. 6 supports DMA transfer completion notification according to embodiments of the present invention. To support DMA transfer completion notification according to embodiments of the present invention, the messaging module (160) receives a buffer identifier of an application buffer containing the application message (601) and creates the data descriptor (608) for the application message (601). The data descriptor (608) may specify the type of DMA transfer operation used to transfer the application message (601) from the origin compute node (600) to the target compute node (604) such as, for example, a direct put data transfer operation or a memory FIFO data transfer operation. The data descriptor (608) may also specify the packet headers for the packets used to encapsulate the message (601) on the network (108).

A direct put operation is a mode of transferring data using DMA engines, typically a DMA engine on an origin node and a DMA engine on a target node. A direct put operation allows data to be transferred and stored to a particular compute node with little or no involvement from the compute node's processor. To effect minimal involvement from the compute node's processor in the direct put operation, the DMA engine of the sending compute node transfers the data to the DMA engine on the receiving compute node along with a specific identification of a storage location on the receiving compute node. The DMA engine on the receiving compute node then stores the data in the storage location specified by the sending compute node's DMA engine. The sending compute node's DMA engine is aware of the specific storage location on the receiving compute node because the specific storage location for storing the data on the receiving compute node has been previously provided to the DMA engine of the sending compute node.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

The messaging module (160) of FIG. 6 also supports DMA transfer completion notification according to embodiments of the present invention by creating a completion notification descriptor (609) to be processed by the reflection compute node (605). In processing the completion notification descriptor (609), the reflection compute node (605) sends the origin compute node a completion packet that is used to trigger an interrupt on the origin compute node to notify a processing core on the origin compute node that the message (601) has been transferred to the target compute node (604).

To provide the completion notification descriptor (609) to the reflection compute node for processing, the messaging module (160) of FIG. 6 also creates a reflection descriptor (607). The reflection descriptor (607) specifies a remote get operation for injecting the completion notification descriptor (609) in a reflection injection FIFO buffer on a reflection compute node (605). A remote get operation is a DMA operation that allows a compute node to retrieve data from another compute node without involving the processor on the compute node providing the data by injecting a descriptor into the other computer node's DMA FIFO buffers.

Figure 7:
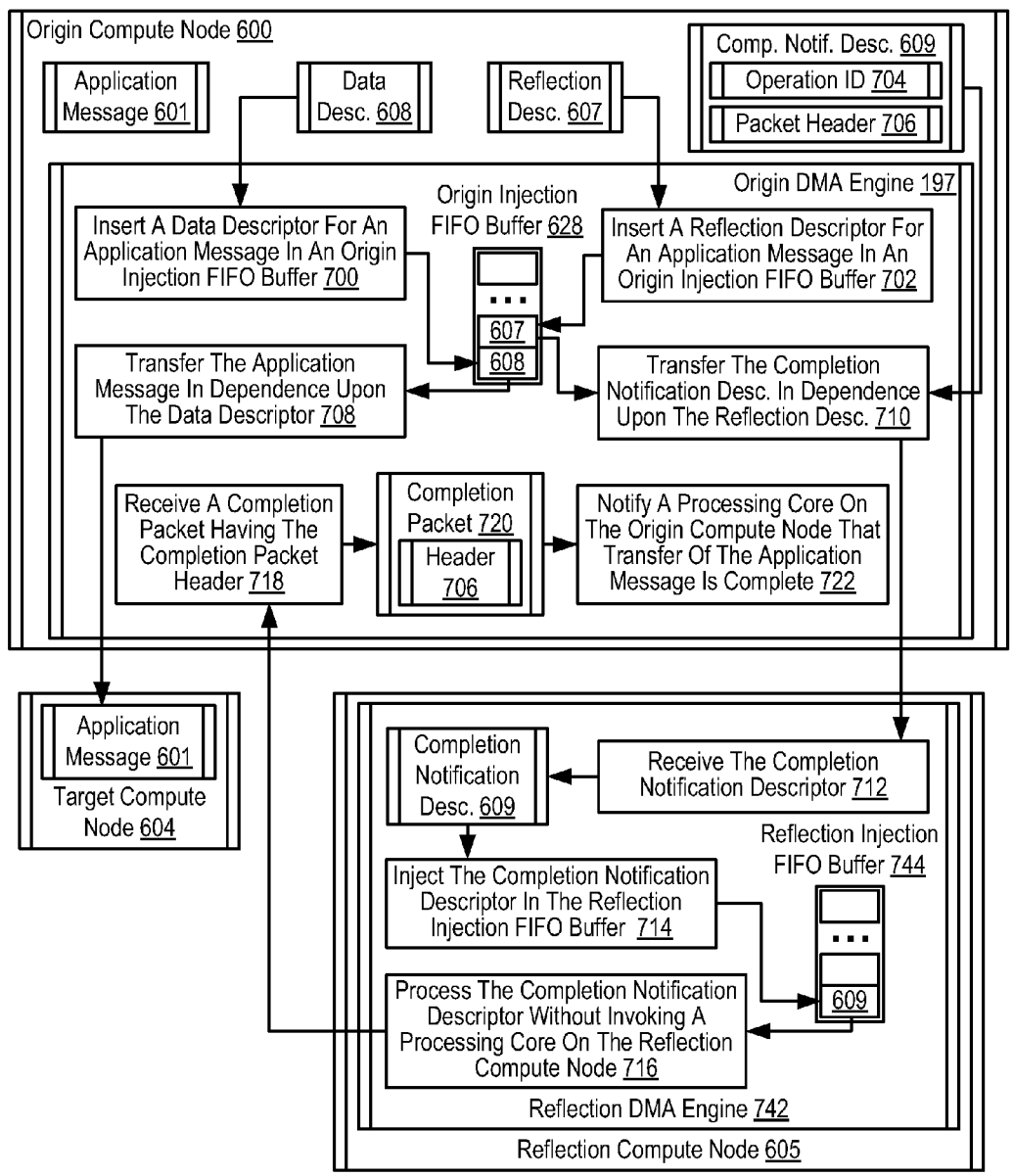
FIG. 7 sets forth a flow chart illustrating an exemplary method for DMA transfer completion notification according to the present invention.

For further explanation, FIG. 7 sets forth a flow chart illustrating an exemplary method for DMA transfer completion notification according to the present invention. The method of FIG. 7 includes inserting (700), by an origin DMA engine (197) on an origin compute node (600) in an origin injection first-in-first-out ('FIFO') buffer (628), a data descriptor (608) for an application message (601) to be transferred to a target compute node (604) on behalf of an application on the origin compute node (600). As mentioned above, the data descriptor (608) of FIG. 7 describes the application message (601) and specifies transmission data for transferring the message (601) to the target compute node (604). Such transmission data may include the type of DMA transfer operation used to transfer the application message (601), the particular DMA counter used to track when the message transfer is complete, the packet header for the packets used to encapsulate the message (601) on the network.

The origin DMA engine (197) on an origin compute node (600) may insert (700) the data descriptor (608) in the origin injection FIFO buffer (628) according to the method of FIG. 7 by receiving the data descriptor (608) from messaging software on the origin compute node (600) and storing the data descriptor (608) in the first available slot in the origin injection FIFO buffer (628). The messaging software on the origin compute node (600) may create the data descriptor (608) in response to a request by an application on the origin compute node (600) to transfer the application message (601) to the target compute node (604) on behalf of the application.

The example of FIG. 7 also includes a completion notification descriptor (609). Upon creating the data descriptor (608) for transferring the application message (601) to the target compute node (604), the messaging software may also create a completion notification descriptor (609) that specifies a data transfer operation between a reflection compute node (605) and the origin compute node (600) used to notify the origin compute node (600) when the data transfer of the application message (601) is complete. The data transfer operation may be implemented as a memory FIFO data transfer operation or a direct put data transfer operation. The data transfer operation is specified by the operation identifier field (704) in the completion notification descriptor (609).

The completion notification descriptor (609) of FIG. 7 is used to notify a processing core on the origin compute node (600) when the data transfer of the application message (601) is complete by specifying a completion packet header (706) for use in the data transfer operation from the reflection compute node (605) to the origin compute node (600). When processing the completion notification descriptor (609), the reflection compute node (605) uses the completion packet header (706) to create a completion packet that is transferred from the reflection compute node (605) to the origin compute node (600). The manner in which the completion packet is used to notify a processing core on origin compute node (600) is described in more detail below.

To transfer to the completion notification descriptor (609) to the reflection compute node (605) for processing, messaging software on the origin compute node (600) creates a reflection descriptor (607). The reflection descriptor (607) specifies a remote get operation for injecting the completion notification descriptor (609) in a reflection injection FIFO buffer (744) on the reflection compute node (605). As mentioned above, a remote get operation is a DMA operation that allows a compute node to retrieve data from another compute node without involving the processor on the compute node providing the data. In the example of FIG. 7, the data retrieved from the reflection compute node using the remote get operation is a completion packet used to notify a processing core on the origin compute node (600) that the transfer of the message (601) is complete.

The method of FIG. 7 includes inserting (702), by the origin DMA engine (197), a reflection descriptor (607) in the origin injection FIFO buffer (628) after the data descriptor (608) for the application message (601). The origin DMA engine (197) may insert (702) a reflection descriptor (607) in the origin injection FIFO buffer (628) according to the method of FIG. 7 by receiving the reflection descriptor (607) from messaging software on the origin compute node (600) and storing the reflection descriptor (607) in the first available slot in the origin injection FIFO buffer (628) after the slot containing the data descriptor (608) for the application message (601). Inserting (702) a reflection descriptor (607) in the origin injection FIFO buffer (628) after the data descriptor (608) for the application message (601) ensures that the reflection descriptor (607) will be processed by the origin DMA engine (197) after the data descriptor (608). That is, inserting (702) a reflection descriptor (607) in the origin injection FIFO buffer (628) after the data descriptor (608) for the application message (601) ensures that the reflection descriptor (607) will be processed by the origin DMA engine (197) after the transfer of the application message (601) is complete.

The method of FIG. 7 also includes transferring (708), by the origin DMA engine (197) to the target compute node (604), the application message (601) in dependence upon the data descriptor (608). The origin DMA engine (197) may transfer (708) the application message (601) to the target compute node (604) in dependence upon the data descriptor (608) according to the method of FIG. 7 by reading the data descriptor (608) from the origin injection FIFO buffer (628), packetizing the application message (601) specified by the data descriptor (608) into packets having a packet header specified by the data descriptor (608), and transmitting the packets to the target compute node (604) through a network interface. In the method of FIG. 7, after all the packets are transmitted to the target compute node (604), the transfer of the application message (601) is complete.

The method of FIG. 7 includes, in response to completing the transfer of the application message (601), transferring (710), by the origin DMA engine (197) to the reflection compute node (605) for injection in the reflection injection FIFO buffer (744) on the reflection compute node (605), the completion notification descriptor (609) in dependence upon the reflection descriptor (607). In response to completing the transfer of the application message (601), the origin DMA engine (197) of FIG. 7 processes the reflection descriptor (607) in the origin injection FIFO buffer (628).

The origin DMA engine (197) may transfer (710) the completion notification descriptor (609) to the reflection compute node (605) for injection in the reflection injection FIFO buffer (744) on the reflection compute node (605) according to the method of FIG. 7 by reading the reflection descriptor (607) from the origin injection FIFO buffer (628), packetizing the completion notification descriptor (609) specified by the reflection descriptor (607) into a remote get packet having a packet header specified by the reflection descriptor (607), and transmitting the remote get packet to the reflection compute node (605) through a network interface.

In the example of FIG. 7, the reflection compute node (605) used to process the completion notification descriptor (609) is implemented is a nearest neighbor of the origin compute node (600). As mentioned above, the nearest neighbors of the origin compute node (600) are those compute nodes physically connected to the origin compute node (600) in the data communication network topology. That is, no intervening compute nodes exist in the physical connection between the origin compute node (600) and the reflection compute node (605).

The method of FIG. 7 includes receiving (712), by a reflection DMA engine (742) on the reflection compute node (605) from the origin compute node (600), the completion notification descriptor (609). The reflection DMA engine (742) may receive (712) the completion notification descriptor (609) from the origin compute node (600) according to the method of FIG. 7 by receiving a remote get packet from the origin compute node (600) through a network interface and unencapsulating the completion notification descriptor (609) from the remote get packet.

The method of FIG. 7 also includes injecting (714), by the reflection DMA engine (742) on the reflection compute node (605), the completion notification descriptor (609) in the reflection injection FIFO buffer (744) on the reflection compute node (605). The reflection DMA engine (742) may inject (714) the completion notification descriptor (609) in the reflection injection FIFO buffer (744) according to the method of FIG. 7 by storing the completion notification descriptor (609) in the reflection injection FIFO buffer (744) and configuring the buffer pointers for the reflection injection FIFO buffer (744) to indicate that the completion notification descriptor (609) has been added to the reflection injection FIFO buffer (744).

The method of FIG. 7 includes processing (716), by the reflection DMA engine (742), the completion notification descriptor (609) without invoking a processing core on the reflection compute node (605). The reflection DMA engine (742) may process (716) the completion notification descriptor (609) without invoking a processing core on the reflection compute node (605) according to the method of FIG. 7 by reading the completion notification descriptor (609) in the reflection injection FIFO buffer (744), creating a completion packet (720) having the completion packet header (706) specified by the completion notification descriptor (609), and transmitting the completion packet (720) to the origin compute node (600) through a network interface.

The method of FIG. 7 also includes receiving (718), by the origin DMA engine (197) from the reflection compute node (605), the completion packet (720). In the example of FIG. 7, the completion packet (720) has the completion packet header (706) specified in the completion notification descriptor (609) created by the messaging software on the origin compute node (600). The origin DMA engine (197) may receive (718) the completion packet (720) from the reflection compute node (605) through a network interface.

The method of FIG. 7 also includes notifying (722), by the origin DMA engine (197) in response to receiving the completion packet (720), a processing core on the origin compute node (600) that the transfer of the application message (601) is complete. The manner in which the origin DMA engine (197) notifies (722) a processing core on the origin compute node (600) that the transfer of the application message (601) is complete may depend on the type of data transfer operation specified by the completion notification descriptor (609). As mentioned above, the completion notification descriptor (609) may specify a memory FIFO data transfer operation or a direct put data transfer operation.

When the completion notification descriptor (609) specifies a memory FIFO data transfer operation between the reflection compute node (605) and the origin compute node (600), the origin DMA engine (197) may notify (722) a processing core on the origin compute node (600) that the transfer of the application message (601) is complete according to the method of FIG. 7 by storing the completion packet (720) in a origin reception FIFO buffer (628) for the origin DMA engine (197), thereby triggering an interrupt. Triggering an interrupt serves to notify the processing core on the origin compute node (600) that the transfer of the application message (601) is complete. Storing the completion packet (720) in a origin reception FIFO buffer (628) for the origin DMA engine (197), thereby triggering an interrupt, may be carried out according to the method of FIG. 7 by configuring the origin DMA engine (197) to trigger an interrupt anytime a packet is stored in the origin reception FIFO buffer (628).

When the completion notification descriptor (609) specifies a direct put data transfer operation between the reflection compute node (605) and the origin compute node (600), the origin DMA engine (197) may notify (722) a processing core on the origin compute node (600) that the transfer of the application message (601) is complete according to the method of FIG. 7 by storing a payload of the completion packet (720) in interrupt-on-touch memory, thereby triggering an interrupt. Interrupt-on-touch memory is a type of computer memory configured to trigger an interrupt each time the computer memory is accessed for reading or writing data. As such, when origin DMA engine (197) stores the payload of the completion packet (720) in interrupt-on-touch memory according to the direct put data transfer operation specified by the completion packet (720), an interrupt is triggered, thereby notifying the processing core on the origin compute node (600) that the transfer of the application message (601) is complete.

Figure 8:
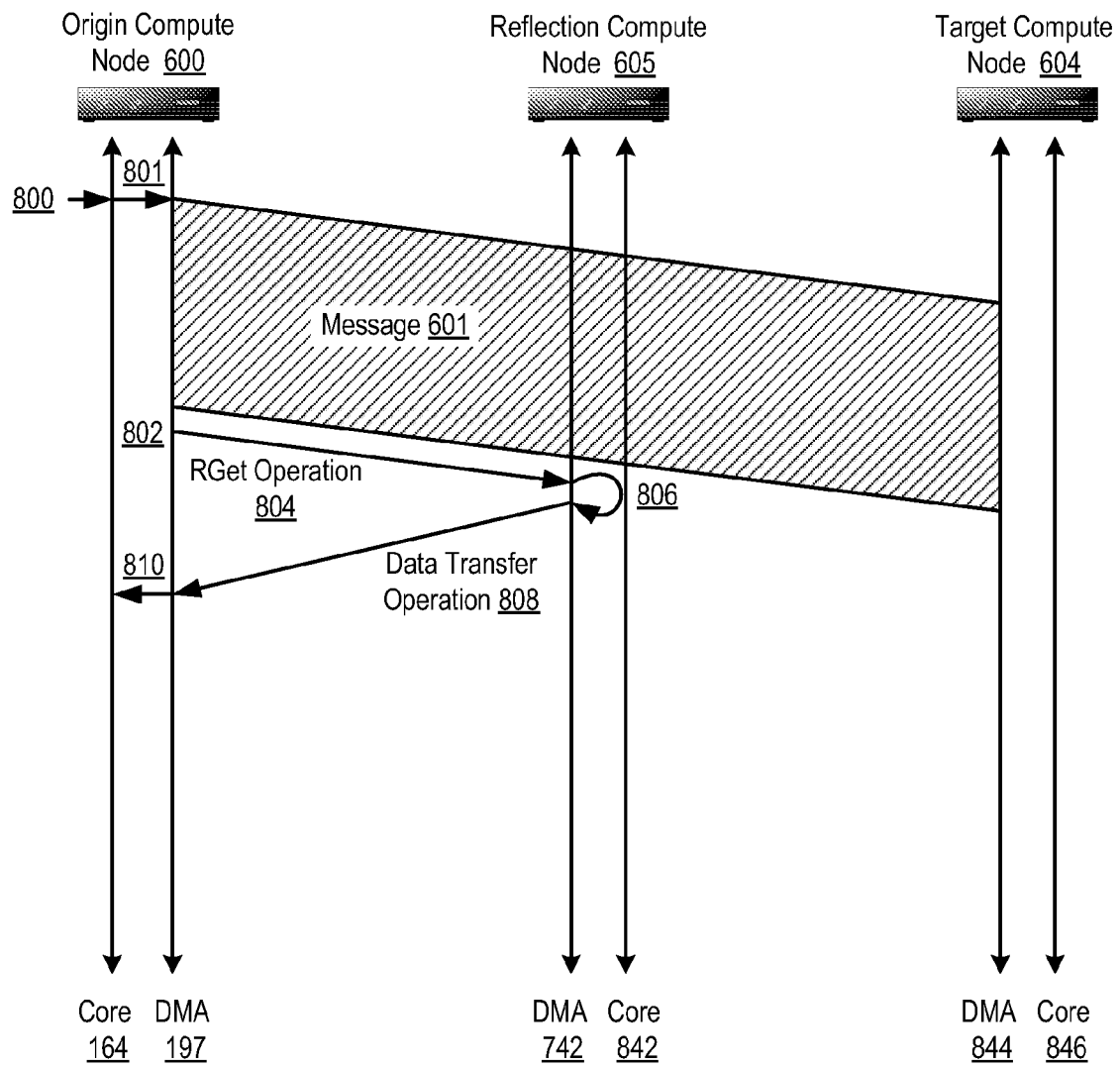
FIG. 8 sets forth a call sequence diagram illustrating an exemplary call sequence for DMA transfer completion notification according to the present invention.

For further explanation, FIG. 8 sets forth a call sequence diagram illustrating an exemplary call sequence for DMA transfer completion notification according to the present invention. The exemplary call sequence diagram of FIG. 8 includes three compute nodes (600, 604, 605), an origin compute node (600), a target compute node (604), and a reflection compute node (605). The origin compute node (600) includes a processing core (164) and an origin DMA engine (197). The target compute node (604) includes a processing core (846) and a target DMA engine (844). The reflection compute node (605) includes a processing core (842) and a reflection DMA engine (742). In the example of FIG. 8, the reflection compute node (605) is a nearest neighbor of the origin compute node (600).

In the exemplary call sequence diagram of FIG. 8, the origin node's processing core (164) creates (800) a data descriptor, a completion notification descriptor, and a reflection descriptor. The data descriptor describes the application message (601) to be transferred to a target compute node (604) on behalf of an application on the origin compute node (600). The completion notification descriptor specifies a data transfer operation between the reflection compute node (605) and the origin compute node (600) used to notify the origin compute node (600) when the transfer of the message (601) is complete. The reflection descriptor specifies a remote get operation for injecting the completion notification descriptor in a reflection injection FIFO buffer on a reflection compute node.

The origin DMA engine (197) processes (801) the descriptors. The origin DMA engine (197) processes (801) the descriptors by inserting the data descriptor in an origin injection FIFO buffer, inserting the reflection descriptor in an origin injection FIFO buffer after the data descriptor, and transferring the application message (601) to the target compute node (604) in dependence upon the data descriptor.

In response to completing the transfer of the application message (601), the origin DMA engine (197) transfers (802) the completion notification descriptor to the reflection compute node (605) for injection in the reflection injection FIFO buffer on the reflection compute node (605) in dependence upon the reflection descriptor. The origin DMA engine (197) transfers (802) the completion notification descriptor to the reflection compute node (605) using a remote get operation (804).

The reflection DMA engine (742) operates (806) on the completion notification descriptor by receiving the completion notification descriptor from the origin compute node (600), injecting the completion notification descriptor in the reflection injection FIFO buffer on the reflection compute node (605), and processing the completion notification descriptor without invoking the reflection node's processing core (842). The reflection DMA engine (742) processes the completion notification descriptor without invoking the reflection node's processing core (842) by reading the completion notification descriptor in the reflection injection FIFO buffer, creating a completion packet having the completion packet header specified by the completion notification descriptor, and transmitting the completion packet to the origin compute node (600) using a data transfer operation (808) such as, for example, memory FIFO data transfer operation or a direct put data transfer operation.

The origin DMA engine (197) processes (810) the completion packet transferred from the reflection compute node using the data transfer operation (808). The origin DMA engine (197) processes (810) the completion packet by receiving the completion packet from the reflection compute node (605) and notifying, in response to receiving the completion packet, origin node's processing core (164) that the transfer of the application message (601) is complete. In the example of FIG. 8, when the data transfer operation (808) is implemented as a memory FIFO data transfer operation, the origin DMA engine (197) may notify the processing core (164) that the transfer of the application message (601) is complete by storing the completion packet in a origin reception FIFO buffer for the origin DMA engine (197), thereby triggering an interrupt. In the example of FIG. 8, when the data transfer operation (808) is implemented as a direct put data transfer operation, the origin DMA engine (197) may notify the origin node's processing core (164) that the transfer of the application message (601) is complete by storing a payload of the completion packet in interrupt-on-touch memory, thereby triggering an interrupt.

Exemplary embodiments of the present invention are described largely in the context of a fully functional computer system for DMA transfer completion notification. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for direct memory access ('DMA') transfer completion notification, the method further comprising:

inserting, by an origin DMA engine on an origin compute node in an origin injection first-in-first-out ('FIFO') buffer, a data descriptor for an application message to be transferred to a target compute node on behalf of an application on the origin compute node;

inserting, by the origin DMA engine, a reflection descriptor in the origin injection FIFO buffer after the data descriptor for the application message, the reflection descriptor specifying a remote get operation for injecting a completion notification descriptor in a reflection injection FIFO buffer on a reflection compute node, the completion notification descriptor specifying a data transfer operation between the reflection compute node and the origin compute node and specifying a completion packet header for use in the data transfer operation;

transferring, by the origin DMA engine to the target compute node, the application message in dependence upon the data descriptor;

in response to completing the transfer of the application message, transferring, by the origin DMA engine to the reflection compute node for injection in the reflection injection FIFO buffer on the reflection compute node, the completion notification descriptor in dependence upon the reflection descriptor;

receiving, by the origin DMA engine from the reflection compute node, a completion packet having the completion packet header specified in the completion notification descriptor; and notifying, by the origin DMA engine in response to receiving the completion packet, a processing core on the origin compute node that the transfer of the application message is complete.

2. The method of claim 1 wherein:

the completion notification descriptor specifies a memory FIFO data transfer operation between the reflection compute node and the origin compute node; and notifying, by the origin DMA engine, a processing core on the origin compute node that transfer of the application message is complete in response to receiving the completion packet further comprises storing the completion packet in a origin reception FIFO buffer for the origin DMA engine, thereby triggering an interrupt.

3. The method of claim 1 wherein:

the completion notification descriptor specifies a direct put data transfer operation between the reflection compute node and the origin compute node; and notifying, by the origin DMA engine, a processing core on the origin compute node that transfer of the application message is complete in response to receiving the completion packet further comprises storing a payload of the completion packet in interrupt-on-touch memory, thereby triggering an interrupt.

4. The method of claim 1 wherein the reflection compute node is a nearest neighbor of the origin compute node.

5. The method of claim 1 further comprising:

receiving, by a reflection DMA engine on the reflection compute node from the origin compute node, the completion notification descriptor;

injecting, by the reflection DMA engine on the reflection compute node, the completion notification descriptor in the reflection injection FIFO buffer on the reflection compute node; and processing, by the reflection DMA engine, the completion notification descriptor without invoking a processing core on the reflection compute node.

6. The method of claim 1 wherein the origin compute node, the target compute node, and the reflection compute node are comprised in a parallel computer, the parallel computer comprising a plurality of compute nodes connected for data communications through the data communications network, the data communications network optimized for point to point data communications.

7. A system for direct memory access ('DMA') transfer completion notification, the system comprising an origin compute node, a target compute node, and a reflection compute node, each compute node comprising one or more computer processors, a DMA controller, a DMA engine installed upon the DMA controller, and computer memory operatively coupled to the computer processors, the DMA controller, and the DMA engine, the computer memory for the origin compute node having disposed within it computer program instructions capable of:

inserting, by an origin DMA engine on an origin compute node in an origin injection first-in-first-out ('FIFO') buffer, a data descriptor for an application message to be transferred to a target compute node on behalf of an application on the origin compute node;

inserting, by the origin DMA engine, a reflection descriptor in the origin injection FIFO buffer after the data descriptor for the application message, the reflection descriptor specifying a remote get operation for injecting a completion notification descriptor in a reflection injection FIFO buffer on a reflection compute node, the completion notification descriptor specifying a data transfer operation between the reflection compute node and the origin compute node and specifying a completion packet header for use in the data transfer operation;

transferring, by the origin DMA engine to the target compute node, the application message in dependence upon the data descriptor;

in response to completing the transfer of the application message, transferring, by the origin DMA engine to the reflection compute node for injection in the reflection injection FIFO buffer on the reflection compute node, the completion notification descriptor in dependence upon the reflection descriptor;

receiving, by the origin DMA engine from the reflection compute node, a completion packet having the completion packet header specified in the completion notification descriptor; and notifying, by the origin DMA engine in response to receiving the completion packet, a processing core on the origin compute node that the transfer of the application message is complete.

8. The system of claim 7 wherein:

the completion notification descriptor specifies a memory FIFO data transfer operation between the reflection compute node and the origin compute node; and notifying, by the origin DMA engine, a processing core on the origin compute node that transfer of the application message is complete in response to receiving the completion packet further comprises storing the completion packet in a origin reception FIFO buffer for the origin DMA engine, thereby triggering an interrupt.

9. The system of claim 7 wherein:

the completion notification descriptor specifies a direct put data transfer operation between the reflection compute node and the origin compute node; and notifying, by the origin DMA engine, a processing core on the origin compute node that transfer of the application message is complete in response to receiving the completion packet further comprises storing a payload of the completion packet in interrupt-on-touch memory, thereby triggering an interrupt.

10. The system of claim 7 wherein the reflection compute node is a nearest neighbor of the origin compute node.

11. The system of claim 7 wherein the computer memory for the reflection compute node has disposed within it computer program instructions capable of:

receiving, by a reflection DMA engine on the reflection compute node from the origin compute node, the completion notification descriptor;

injecting, by the reflection DMA engine on the reflection compute node, the completion notification descriptor in the reflection injection FIFO buffer on the reflection compute node; and processing, by the reflection DMA engine, the completion notification descriptor without invoking a processing core on the reflection compute node.

12. The system of claim 7 wherein the origin compute node, the target compute node, and the reflection compute node are comprised in a parallel computer, the parallel computer comprising a plurality of compute nodes connected for data communications through the data communications network, the data communications network optimized for point to point data communications.

13. A computer program product for direct memory access ('DMA') transfer completion notification, the computer program product disposed upon a computer readable recordable medium, the computer program product comprising computer program instructions capable of:

inserting, by an origin DMA engine on an origin compute node in an origin injection first-in-first-out ('FIFO') buffer, a data descriptor for an application message to be transferred to a target compute node on behalf of an application on the origin compute node;

inserting, by the origin DMA engine, a reflection descriptor in the origin injection FIFO buffer after the data descriptor for the application message, the reflection descriptor specifying a remote get operation for injecting a completion notification descriptor in a reflection injection FIFO buffer on a reflection compute node, the completion notification descriptor specifying a data transfer operation between the reflection compute node and the origin compute node and specifying a completion packet header for use in the data transfer operation;

transferring, by the origin DMA engine to the target compute node, the application message in dependence upon the data descriptor;

in response to completing the transfer of the application message, transferring, by the origin DMA engine to the reflection compute node for injection in the reflection injection FIFO buffer on the reflection compute node, the completion notification descriptor in dependence upon the reflection descriptor;

receiving, by the origin DMA engine from the reflection compute node, a completion packet having the completion packet header specified in the completion notification descriptor; and notifying, by the origin DMA engine in response to receiving the completion packet, a processing core on the origin compute node that the transfer of the application message is complete.

14. The computer program product of claim 13 wherein:

the completion notification descriptor specifies a memory FIFO data transfer operation between the reflection compute node and the origin compute node; and notifying, by the origin DMA engine, a processing core on the origin compute node that transfer of the application message is complete in response to receiving the completion packet further comprises storing the completion packet in a origin reception FIFO buffer for the origin DMA engine, thereby triggering an interrupt.

15. The computer program product of claim 13 wherein:

the completion notification descriptor specifies a direct put data transfer operation between the reflection compute node and the origin compute node; and notifying, by the origin DMA engine, a processing core on the origin compute node that transfer of the application message is complete in response to receiving the completion packet further comprises storing a payload of the completion packet in interrupt-on-touch memory, thereby triggering an interrupt.

16. The computer program product of claim 13 wherein the reflection compute node is a nearest neighbor of the origin compute node.

17. The computer program product of claim 13 further comprising computer program instructions capable of:

receiving, by a reflection DMA engine on the reflection compute node from the origin compute node, the completion notification descriptor;

injecting, by the reflection DMA engine on the reflection compute node, the completion notification descriptor in the reflection injection FIFO buffer on the reflection compute node; and processing, by the reflection DMA engine, the completion notification descriptor without invoking a processing core on the reflection compute node.

18. The computer program product of claim 13 wherein the origin compute node, the target compute node, and the reflection compute node are comprised in a parallel computer, The parallel computer comprising a plurality of compute nodes connected for data communications through the data communications network, the data communications network optimized for point to point data communications.

* * * * *